Figure 1:
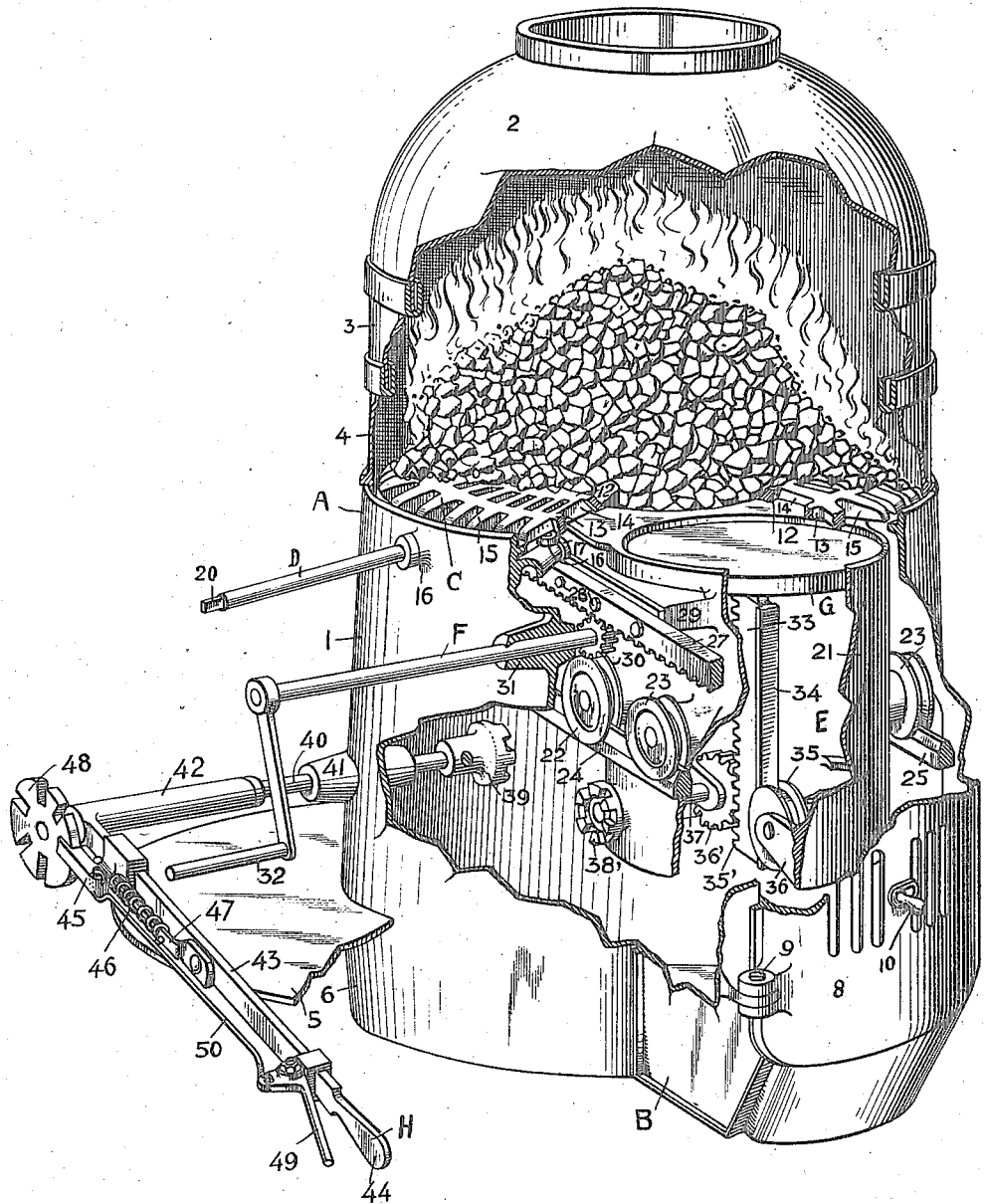

G. A. KEIDEL.
AUTOMATIC UNDERFEEDER.
APPLICATION FILED OCT. 12, 1916.

1,263,430.  Patented Apr. 23, 1918.
6 SHEETS—SHEET 1.

Inventor
G. A. Keidel
By Attorney
Albert F. Nathan

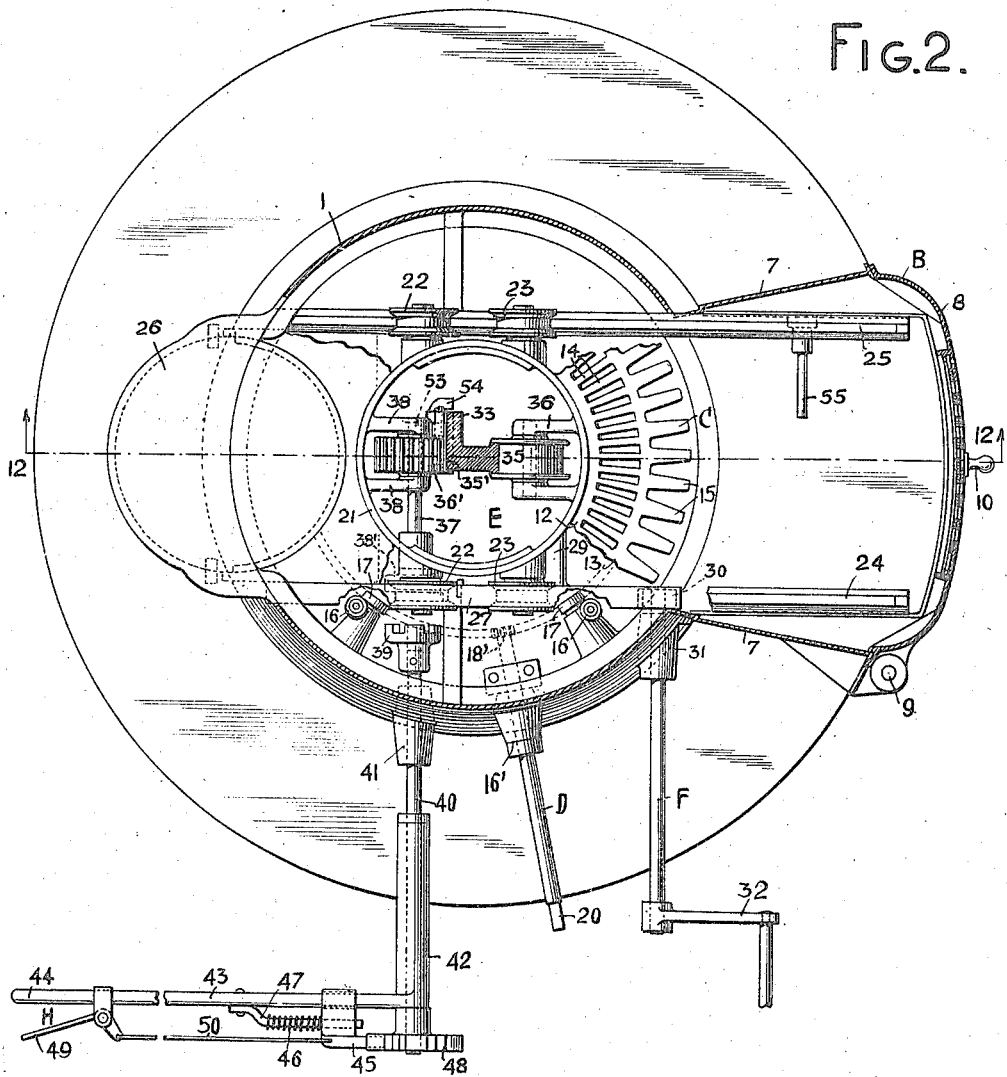
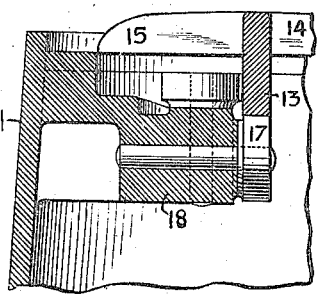
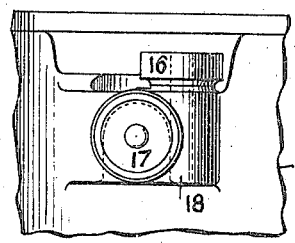

G. A. KEIDEL.
AUTOMATIC UNDERFEEDER.
APPLICATION FILED OCT. 12, 1916.
1,263,430.
Patented Apr. 23, 1918.
6 SHEETS—SHEET 3.
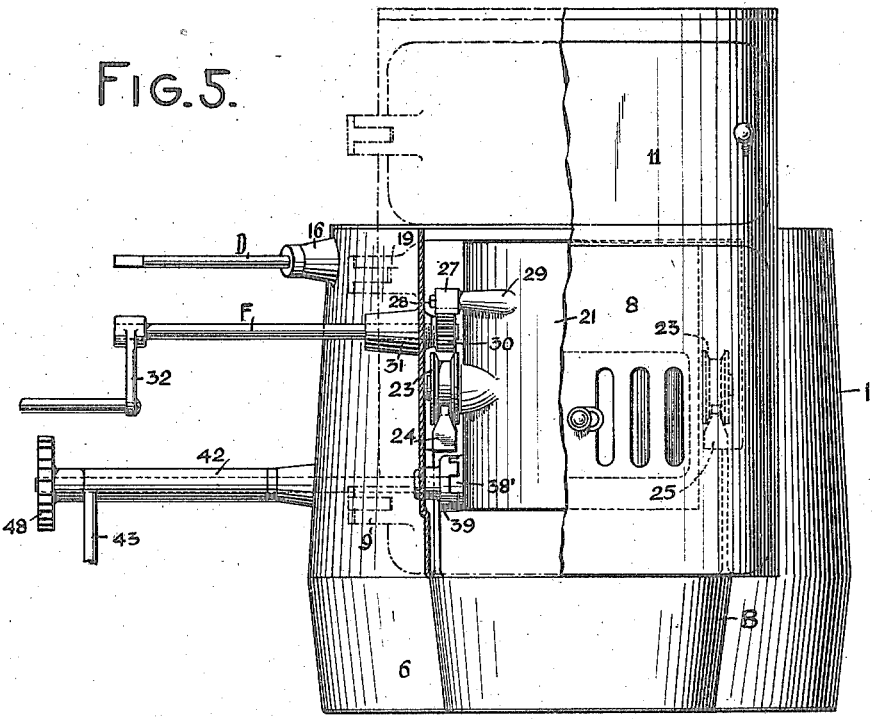
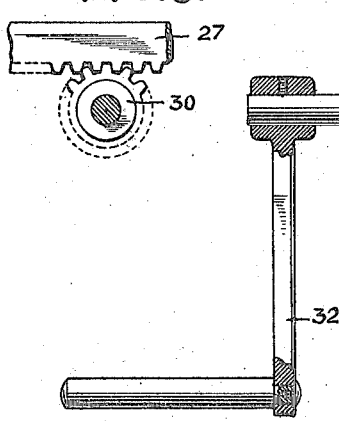
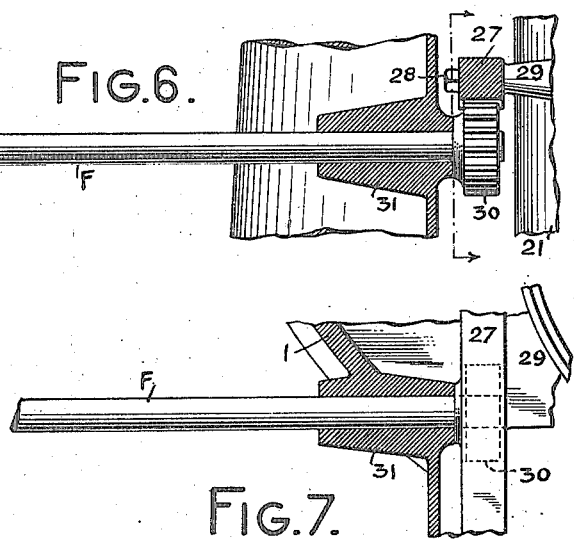
Inventor
G. A. Keidel
By Attorney
Albert F. Nathan

G. A. KEIDEL.
AUTOMATIC UNDERFEEDER.
APPLICATION FILED OCT. 12, 1916.

1,263,430.

Patented Apr. 23, 1918.
6 SHEETS—SHEET 5.

Inventor
G. A. Keidel
By Attorney
Albert F. Nathan

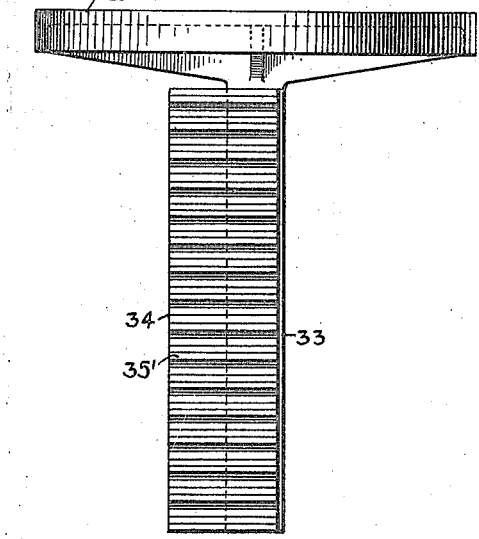
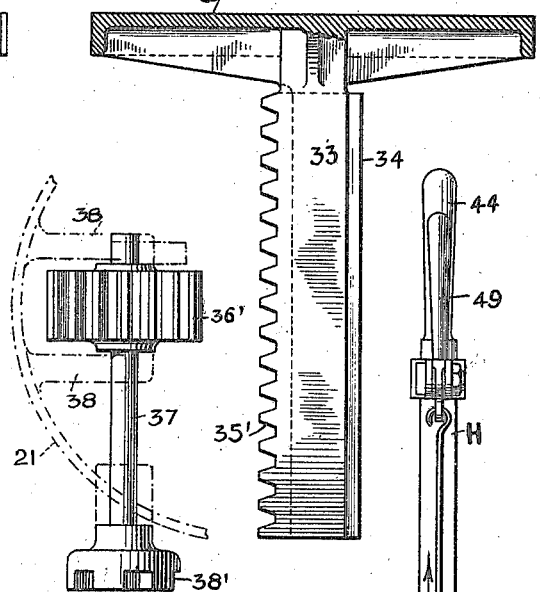
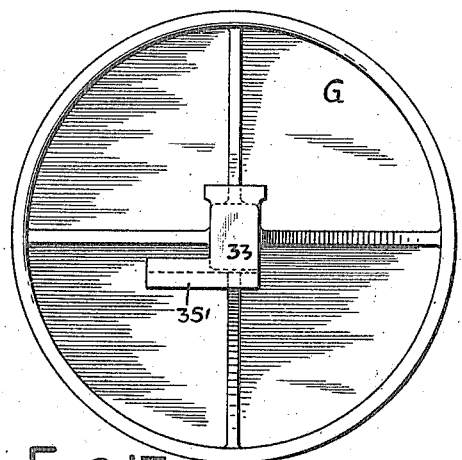
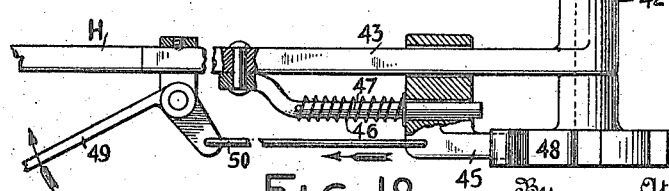
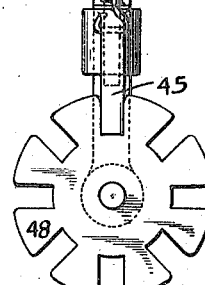

UNITED STATES PATENT OFFICE.

GEORGE A. KEIDEL, OF NORWOOD, OHIO.

AUTOMATIC UNDERFEEDER.

1,263,430.  Specification of Letters Patent.  Patented Apr. 23, 1918.

Application filed October 12, 1916. Serial No. 125,204.

*To all whom it may concern:*

Be it known that I, GEORGE AUGUST KEIDEL, a citizen of the United States, and residing at Norwood, in the county of Hamilton and State of Ohio, have invented a new and Improved Automatic Underfeeder, of which the following specification is a full disclosure.

This invention deals with under-feeding furnaces and it proposes a construction characterized by (1) a grate and an independently shiftable coal-gun therefor, all being thoroughly incased to enable the gun to be refilled with coal and to fill the grate without permitting the escape of ashes or disturbing the drafts; (2) a grate and coal-gun providing instrumentalities for manipulating the same externally of the casing; (3) a centrally located coal-gun adapted to be laterally shifted for refilling purposes combined with an annular grate adapted to be oscillated about its central vertical axis, said parts being all contained within a casing constituting an ash pit and draft controlling means; and (4) a construction as above specified with the parts so arranged as to not require a cellar pit of great depth.

A general object is to devise a furnace construction of the nature described in which the parts can be easily controlled and shifted, which admits of being made at low factory cost, and which is so simple and durable as to be operable by an unskilled person and without liability of damage.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure and in such drawings like characters of reference denote corresponding parts throughout all the views, of which:—

Figure 9:
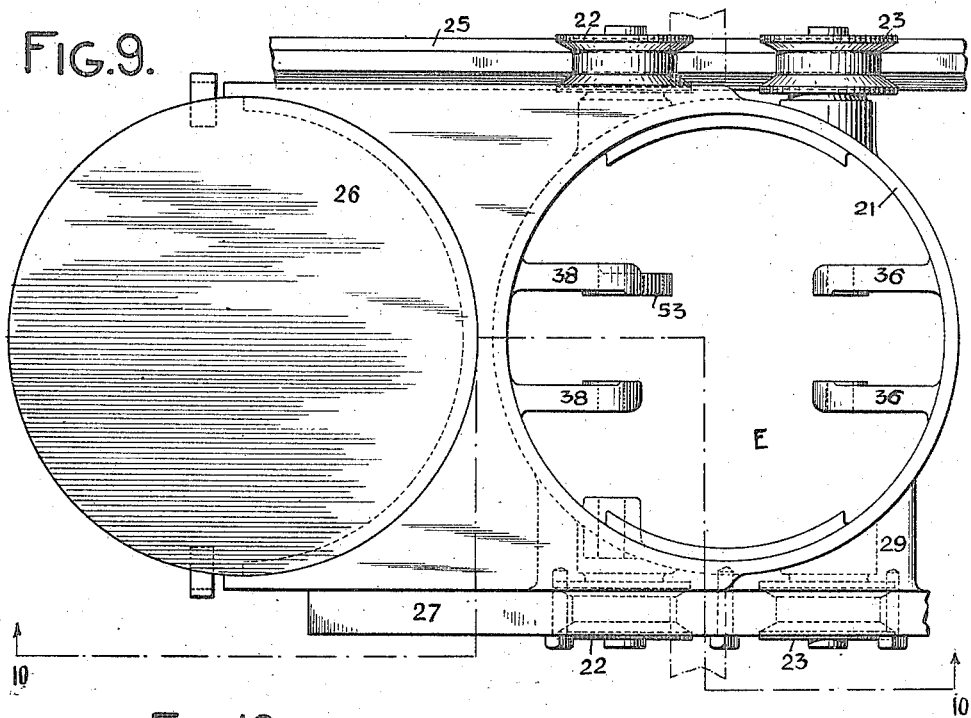
Figure 10:
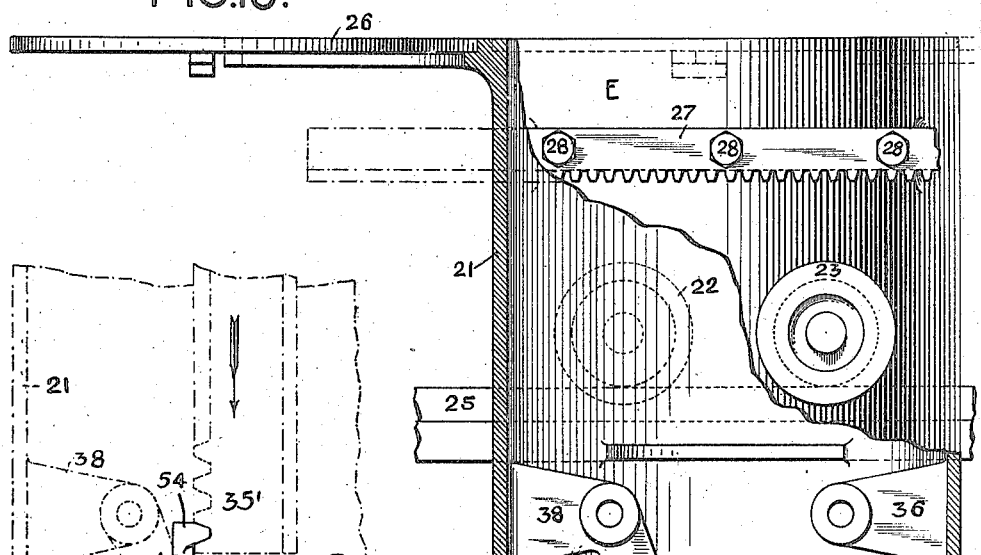
Figure 11:
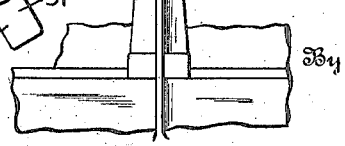
Figure 12:
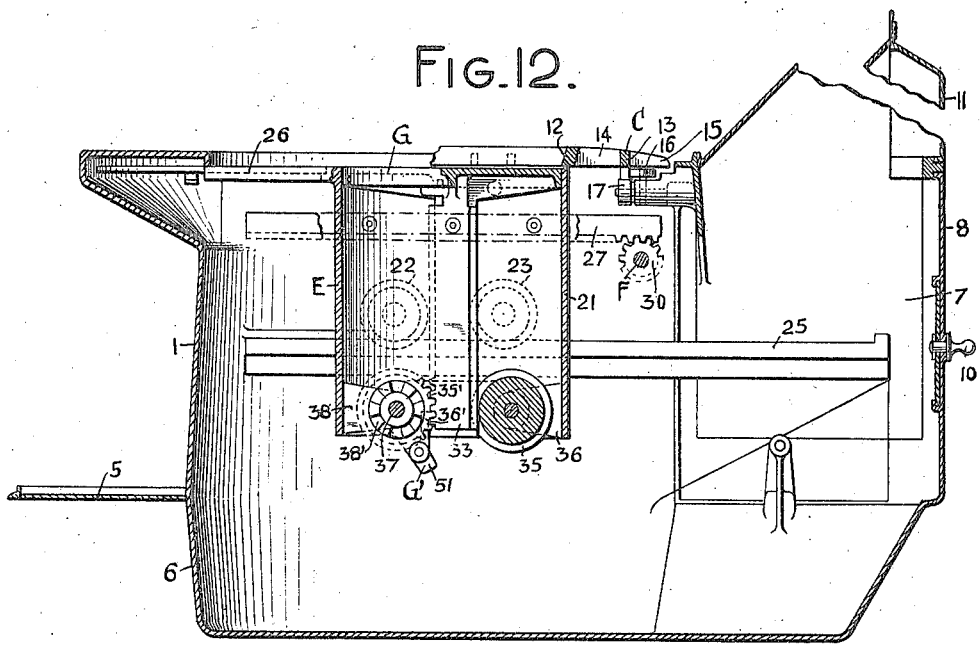
Figure 13:
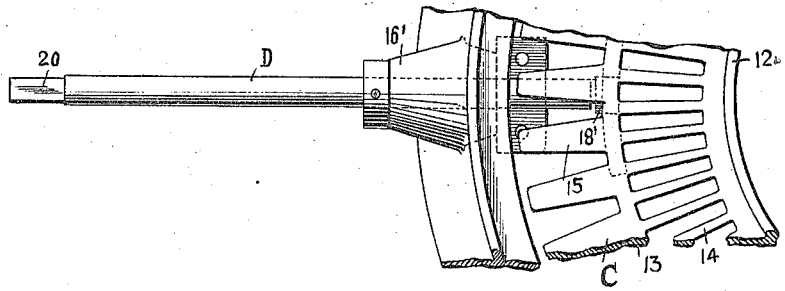
Figure 14:
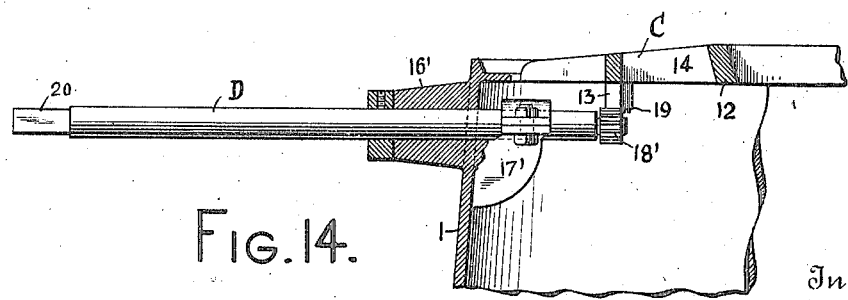

Figure 1 is a sectional perspective of this embodiment. Fig. 2 is a plan thereof with the annular grate broken away to expose operating elements. Figs. 3 and 4 are details of the guide-rollers for the oscillating grate. Fig. 5 is a front elevation of a furnace equipped with this invention. Figs. 6, 7 and 8 are details of the rack and pinion feed for the coal-gun. Fig. 9 is an enlarged plan of the coal-gun showing the track-way therefor. Fig. 10 is a vertical section of the coal-gun through line 10—10 of Fig. 9. Fig. 11 is a detail of the lock for holding the plunger uplifted. Fig. 12 is a vertical section through line 12—12 of Fig. 2. Figs. 13 and 14 are a fragmentary plan and a sectional elevation, respectively, of the grate oscillator. Figs. 15 and 16 are elevations of the plunger showing the construction of the lifting rack. Fig. 17 is a view of the underside of the plunger. Figs. 18 and 19 are details of the hand means for uplifting the plunger.

This invention as exemplified by the embodiment thereof herein illustrated comprehends an improved combination of an annular vibratable grate and a transportable coal-gun for intermittently under-feeding coal centrally upward onto said grate; all of said parts being effectively incased and provided with instrumentalities for manipulating them externally of the casing. The entire construction and arrangement is such that the structure is preëminently suitable for instalment in private residences by reason of its compactness, its durability and simplicity, its ease of operation, and its economy and effectiveness.

The casing, as formed and as related to the other elements, is of primary consequence in this invention, and it is here instanced as a sectional shell A embodying a foundation 1, a dome 2, and one or more connecting portions 3 and 4. This sectional shell contains the fire-box and provides an ash-pit, and it regulates the rate of combustion by controlling the inflow of air and the out-flow of gases.

Thus, the lower section 1 may provide a horizontally extending flange 5 which will normally rest on the floor of the cellar and the casing section has a portion 6 extending below the level of the flange 5 and adapted to be contained within a pit in the cellar floor and to constitute the ash-box or pit of the furnace. This section 1 is provided with an opening in its forward side which is closed by a bay B having the side walls 7 and provided with the lower door 8 hinged at 9 and adapted to be used for removing ashes and also having an adjustable air inlet 10 for regulating the combustion. This bay also is provided with an upper door 11 for filling the coal-gun with coal.

The under-feed grate is an essential characteristic of this combination and it contemplates an annular grate C which is adapted to be fed with coal upwardly through its center region, and which admits air upwardly and ashes downwardly through its perforated periphery. This annular grate consists of an inner ring 12 through which the coal is up-fed, and an outer ring 13. A radial series of bars 14 extend between the rings 12 and 13 and an outer series of ribs or bars 15 likewise radiate from the other ring, these ribs constituting the grate. This grate is supported by the outer ring 13 which has its lower edge in rolling engagement with the horizontal roller 16 and the vertical roller 17 which are pivoted to a portion 18 carried by the casing section 1. A series of these bearings is provided so as to support the grate at spaced intervals. This grate receives fuel upwardly through its center, and this fuel falling over on the perforate annular portion forms a combustion zone and the ashes from the consumed fuel are permitted to descend through the apertures of the grate. To that end, a means for agitating the grate is provided as follows:—

The grate oscillator consists of a rock-shaft D which is journaled in a boss 16 extending upwardly from the casing 1, and it may also be journaled by the bracket 17' on the inner side thereof and at its end it carries a pinion 18' which meshes with a rack 19 provided by the ring 13. The other end 20 of this shaft D is squared to receive an operating handle so that the shaft may be rocked and thereby communicate a rotary or oscillating motion to the grate so as to shake down the ashes into the underlying pit.

The coal-gun is in the nature of a container which is adapted to be shifted to one side where it has to be filled with coal and then it has to be moved into concentric relation with the grate and, by suitable operating means, the coal is then progressively fed upwardly and onto the grate in the form of a pyramid. This coal-gun is generally indicated by E and it comprises a casing having a cylindrical or tubular portion 21 having a pair of grooved rollers 22 and 23 journaled on opposite sides thereof and which ride on tracks 24 and 25 carried by the casing 1 and spaced apart as shown. By this arrangement the coal-gun is enabled to be transported from this position concentric with the grate to a coal-receiving position at one side. The upper end of the cylindrical part 21 has, extending laterally at one side, an apron 26 which is circular in shape and is adapted to close the well of the grate when the coal-gun is in its coal-receiving position. This closure is for the purpose of preventing the backward movement of the coal. For the purpose of shifting the position of the coal-gun, a rack 27 is secured to one side thereof by means of screws 28 and the extension 29, and this rack is propelled by means of a pinion 30 at the extremity of the rotary shaft F which is journaled in a boss 31 extending from the outer casing 1. This shaft is in turn rotated by means of a crank 32 thereby enabling the coal-gun to be shifted in position. When it is shifted to its outermost or coal-receiving position, the cylindrical part 21 takes position in registry with the upper door 11 so that by opening this door coal may be thrown into the interior of the tubular portion 21. It is to be noted that when the coal-gun is in this position, it excludes the entry of air through the coal-filling door. By this arrangement, the normal draft of the furnace need not be in the least disturbed during the filling operation, and there is, therefore, no sudden influx of air which would otherwise cause a temporary rise of temperature that would exercise a disturbing influence on the rate of combustion for some time. The tubular portion 21 contains a piston G which may rise from a lower position into one flush with the upper edge of the cylindrical portion. This piston G has a depending stem 33 having a track 34 along its back vertical edge, which track rides in a grooved roller 35 carried by a boss 36 extending inwardly from the tubular portion 21. The opposite vertical edge of the stem 33 carries a rack 35' which meshes with a pinion 36' affixed to the end of a shaft 37 which is journaled in the wings 38 extending inwardly from the tubular portion 21, as shown best by Fig. 18. The outer end of this shaft 37 extends through the tubular portion 21 of the coal-gun and carries a dog-tooth-clutch 38' which is used for the purpose of connecting the shaft 37 with a hand means whereby the piston may be raised after the coal-gun has been brought into its concentric position.

This hand means for elevating the piston comprehends the shaft 40 which extends through the casing portion 1, and by means of a boss 41 it is journaled so that it can rotate and also so that it can be shifted longitudinally. The inner end of this shaft carries a dog-tooth-clutch 39 which, when the coal-gun is in its operative position will co-axially register with the clutch 38' so that it may be interlocked therewith by a shifting of the shaft 40.

To disengage the clutch 39, it is merely necessary to pull the elevating unit including the shaft 40 outwardly to slide said shaft in the bearing 41 and withdraw the clutch 39 axially from the clutch 38'. The converse movement will effect an engagement when said clutches are coaxially arranged. When the parts are thus engaged, the piston may be progressively elevated by a rotation of the shaft 40 which is effected by means of a hand-lever H. This hand-lever consists of a sleeve 42 journaled on the shaft 40 and having a lever-rod 43 extending radially therefrom and terminating in a handle 44. This rod slidably carries a detent 45 which is normally urged home by means of a spring 46 circumscribing the guide rod 47.

Keyed to the end of the shaft 40 is a star-wheel 48, in any one of the clutches of which the detent 45 may enter and with respect to which adjustment may be made by means of the finger lever 49 and the pull-rod 50, as will be understood. This mechanism is used only for elevating the piston and not for lowering it, and this operation will preferably be intermittent. The lowering of the piston is controlled by means of a click G' (see Fig. 11) which operates ratchet-wise to hold the piston to whatever degree it has been elevated. This click G' is pivoted at 52 to an extension 53 and its lower end 51 is weighted so as to keep its detent portion 54 in engagement with the teeth of the rack 35'.

When the piston has been completely elevated so as to bring its upper surface flush with the top of the cylinder 21 and when all of the coal has been fed into the furnace, the clutch 39 is disengaged and the click G' holds the piston uplifted so that when the crank 32 rotates the shaft F the coal-gun will be laterally shifted to its coal-receiving position, and the shelf 26 will hold the coal in the furnace from dropping down. During the last operation of this lateral shifting, and after the piston has cleared the coal, a stud 55 will impact the upper end 54 of the click G' and swing it anti-clockwise thereby releasing the ratchet and permitting the piston to drop into its lowermost position. The coal port is then opened and the cylinder is filled with coal, and by means of the handle 32 the coal-gun is then returned to its normal position and the clutch 39 is re-engaged.

It will thus be seen that this invention provides a very simple and efficient means for controlling a furnace and in regulating the underfeeding of coal thereinto. By this means the combustion is carried out candle-wise without smoke and the ashes are taken care of without creating dust, and what is most important the coal is very easily fed into the grate only at the rate adapted to maintain steady and even combustion. The apparatus is so compact and well proportioned that it may be used by unskilled persons with the very greatest of convenience.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore, such adaptations should and are intended to be comprehended within the meaning and range of equivalency of the following claims.

Having thus revealed this invention, I claim as new and desire to secure the following combinations of elements, or equivalents thereof, by Letters Patent of the United States:—

1. An underfeed furnace combining an annular grate providing a coal-well and a perforate rim; a piston-feed coal-holder normally underlying said coal-well and shiftable laterally to a coal-receiving position; a casing wholly inclosing said parts and constructed to provide a coal-charging port formed to substantially interfit with said coal-holder, said casing also having air-inlets; and mechanism operable externally of said casing for shifting said coal-holder, while inclosed within said casing, into registry with said port to enable said coal-holder to coöperate with said casing in preventing disturbing the normal drafts or permitting the escape of dust during a coal-supplying operation.

2. An underfeed furnace combining an annular grate providing a central coal-well and adapted to be turned about its vertical axis to release ashes from its perforate rim; a piston-feed coal-holder normally underlying said coal-well and shiftable laterally to a coal-receiving position; a casing wholly inclosing said parts and having air-inlets and a coal-feeding door constructed and arranged for registering coöperation with said coal-holder when in its coal-receiving position; and mechanism operable externally of said casing for shifting said coal-holder while within said casing into the aforesaid coal-receiving relation with said door to enable it to be charged with coal and also enable it to coöperate with said casing in preventing disturbing the drafts or permitting the escape of dust.

3. An underfeed furnace combining an annular grate providing a coal-well and a perforate rim; a coal-gun having its plunger normally underlying said coal-well and shiftable laterally to a coal-receiving position; a casing wholly inclosing said parts and having air-inlets; mechanism operable externally of said casing for shifting said coal-holder while within said casing to enable it to be charged with coal; escapement-mechanism effective throughout the entire elevating stroke of said plunger for preventing said plunger from being lowered while in its normal coal-feeding position; and means for rendering ineffective said escapement-mechanism to thereby release said plunger when said coal-gun is not in its normal position.

4. An underfeed furnace combining an annular grate providing a central coal-well and a perforate rim; means for oscillating said grate; a coal-holder having a piston normally underlying said coal-well and shiftable laterally to a coal-receiving position; a casing wholly inclosing said parts and having air-inlets and a coal-door constructed and arranged to register with the coal-holder to seal the parts against a substantial admission of air; locking means automatically effective throughout the entire elevating stroke of said plunger to lock said piston against depression; mechanism operable externally of said casing for shifting said coal-holder while within said casing; and means releasing said locking means to enable the coal-holder to be charged with coal.

5. An underfeed furnace combining a shiftable annular grate; a shiftable coal-gun comprising a cylindrical shell having a laterally extending imperforate shelf adapted to close the center of the grate; means for intermittently raising the piston of said coal-gun when in its coal-discharging position; ratchet-means continuously effective throughout the entire upward travel of said piston for preventing its return from all of its successively elevated positions; independent means for bodily shifting the position of said coal-gun; and means for rendering ineffective said ratchet-means when said coal-gun has been shifted out of its coal-discharging position.

In witness whereof, I hereunto subscribe my name, as attested by the two subscribing witnesses.

GEO. A. KEIDEL.

Witnesses:
  ROBT. HARTLEY,
  P. RUZICKA.

Copies of this patent may be obtained for five cents each, by addressing the "Commissioner of Patents, Washington, D. C."